United States Patent
Tune (10) Patent No.: US 9,300,716 B2
(45) Date of Patent: Mar. 29, 2016

(54) MODELLING DEPENDENCIES IN DATA TRAFFIC

(71) Applicant: Andrew David Tune, Dronfield (GB)

(72) Inventor: Andrew David Tune, Dronfield (GB)

(73) Assignee: ARM Limited, Cambridge (GB)

( * ) Notice: Subject to any disclaimer, the term of this patent is extended or adjusted under 35 U.S.C. 154(b) by 476 days.

(21) Appl. No.: 13/623,183

(22) Filed: Sep. 20, 2012

(65) Prior Publication Data

US 2014/0082121 A1    Mar. 20, 2014

(51) Int. Cl.
| | |
|---|---|
| G06F 15/167 | (2006.01) |
| H04L 29/08 | (2006.01) |
| H04L 12/26 | (2006.01) |
| G06F 12/08 | (2006.01) |

(52) U.S. Cl.
CPC ............ *H04L 67/00* (2013.01); *G06F 12/0895* (2013.01); *G06F 15/167* (2013.01); *H04L 43/50* (2013.01)

(58) Field of Classification Search
CPC ....... H04L 67/00; H04L 43/50; G06F 15/167; G06F 12/0895; G06F 17/502; G06F 17/5027; G06F 17/5031
USPC .......... 709/213, 214, 215, 216; 711/117, 130, 711/167; 703/13, 16, 19, 28
See application file for complete search history.

(56) References Cited

U.S. PATENT DOCUMENTS

| | | | | |
|---|---|---|---|---|
| 5,848,264 | A * | 12/1998 | Baird et al. ...................... | 703/28 |
| 6,028,847 | A * | 2/2000 | Beanland ...................... | 370/252 |
| 7,054,987 | B1 * | 5/2006 | Reed et al. .................... | 710/310 |
| 2004/0102951 | A1 * | 5/2004 | Agarwala et al. .............. | 703/23 |
| 2005/0209839 | A1 * | 9/2005 | Nightingale et al. ........... | 703/19 |
| 2010/0138839 | A1 * | 6/2010 | Bekooij et al. ................ | 718/102 |
| 2010/0241812 | A1 * | 9/2010 | Bekoou ......................... | 711/141 |
| 2010/0250802 | A1 * | 9/2010 | Waugh et al. ................. | 710/100 |
| 2012/0185231 | A1 * | 7/2012 | Lo et al. .......................... | 703/21 |
| 2012/0216080 | A1 * | 8/2012 | Bansal et al. ................... | 714/45 |

OTHER PUBLICATIONS

R. Hassan et al, "A Hybrid Markov Model for Accurate Memory Reference Generation" Jan. 2007, 6 pages.
J. Hestness et al, "Netrace: Dependency-Driven Trace-Based Network-on-Chip Simulation" ACM, 2010, 6 pages.
T. Grass, "Extending a Full-System Simulator With Traffic Generation and Elastic Traces" Jan. 2011, pp. 1-70.
M.W. Brehob, "On the Mathematics of Caching" A Dissertation Submitted to Michigan State University, 2003, pp. 1-134.

* cited by examiner

*Primary Examiner* — Cheikh Ndiaye (74) *Attorney, Agent, or Firm* — Nixon & Vanderhye P.C.

(57) ABSTRACT

Timings of data traffic in a test system are modified by introducing dependencies that would arise in response to data requiring access to a resource comprising a buffer for storing pending data related to an access to the resource that cannot currently complete. A maximum value of a counter is set to a value corresponding to the buffer size. Data traffic is input, and the counter is updated in response to the data requiring the resource and being stored in the buffer and in response to the data traffic indicating a buffer entry has become available. Where the data requires the buffer and the counter is at its maximum value indicating the buffer is full, a timing of the data access requiring the buffer is modified indicating that the data is stalled until the buffer has capacity again, and the data traffic is updated with the modified timing.

18 Claims, 9 Drawing Sheets

MODELLING DEPENDENCIES IN DATA TRAFFIC

TECHNICAL FIELD

The technical field relates to the field of test and in particular to the testing of systems comprising different devices connected by an interconnect.

BACKGROUND

When determining the behaviour of a system on chip in a test system, data traffic or vectors are generated for input into a model of at least some of the system including the interconnect connecting the various devices and the resulting performance of the system is analysed. The model may be a software model or it may be a circuit built perhaps out of field programmable gate arrays, FPGA to model the system or it may be an emulator.

The data traffic may be generated from real data traffic by tracing a data stream on a bus of a real system, this trace data then being replayed and input to the test system, or it may be example data traffic generated by a model that models the initiators of the system and generates example data traffic as a probability representative of what requests will be sent at what time.

A problem with this is that the dependencies between the transactions within the initiators such as the CPU's or the GPU's are generally not captured. However, dependencies within these devices cause their performance to vary as properties of the environment in which they are connected change. Thus, although the data traffic may be representative of a system at a certain point, if the system is amended in some way and then re-tested the results may no longer be representative as any dependencies such as data dependencies arising within the initiator themselves will not be modelled and yet these may affect the performance. In particular, many initiators or masters are self-throttling, CPU's for example often need results to be sent back from the interconnect to be able to continue while GPU's generally don't and will be less affected by changes within the interconnect. Thus, if a CPU is unable to proceed without receiving the results of a load instruction for example, this delay may in turn further delay the issuing of subsequent load or store instructions. Changes in the system that affect this delay will therefore also affect the dependent functions and if this is not accounted for in the model the resulting modelled performance will no longer be representative.

One way of addressing this in the prior art has been with the use of adaptive trace in which the data representative of the data traffic on the bus that is input to the system contains realistic dependencies between the transactions. This is expensive to capture as you need to implement the actual system to know where the dependencies arise so that the masters of the system need to be masters that you can instrument.

It would be desirable to be able to model a system that takes some account of dependencies without unduly increasing the complexity or size of the model.

SUMMARY

A first aspect provides a method of modifying timings of data traffic in a test system by introducing dependencies that would arise in response to data requiring access to a resource, said resource receiving said data traffic from at least one initiator and being connected via an interconnect to at least one recipient, said resource comprising a buffer for storing pending data related to an access to said resource that cannot currently complete; said method comprising the steps of:

setting a maximum value of a counter which represents said buffer, to a value representative of said buffer size;

inputting data traffic;

updating said counter in response to said data requiring said resource and being stored in said buffer and in response to said data traffic indicating a buffer entry has become available;

determining where said data requires said buffer and said counter is at its maximum value indicating said buffer is full;

modifying a timing of said data access requiring said buffer indicating that said data is stalled until said buffer has capacity again;

updating said data traffic with said modified timing.

The technology described herein recognises that resources that may not be immediately available to data traffic and that therefore have a pending buffer for storing requests or data that cannot currently complete do themselves introduce dependencies into data traffic flow in a system.

Where the system is being tested and models are used to predict behaviour, allowing for these buffers and modifying the timings in response to them will improve the accuracy of the modelling. Furthermore in certain circumstances the dependencies due to these buffers may themselves be the main source of timing variation dependencies within the system and thus, accounting for them within the model may significantly improve the model even if other dependencies within the initiator or software code are not taken into account by the model. This can be advantageous as allowing for dependencies due to a buffer is relatively simple and easy to model, while allowing for dependencies that arise in the code or the initiator may be much more difficult.

It should be noted that data traffic comprises any message that is passed through the system and therefore will include requests, responses to requests, addresses, coherency information, data and any other message that pass through the system.

In some embodiments said method comprises a further step of determining a size of said buffer of said resource, said step of setting said maximum value of said counter being performed in response to said determining step.

Although the size of the buffers may be input to the model in advance in some embodiments the method determines the size of the buffer, perhaps from configuration data, or perhaps by storing data in the buffer and determining when it is full, the method setting the maximum value of the counters to correspond to the determined buffer size.

In some embodiments said resource comprises a shared resource.

Although the resource may not be a shared resource if it is a resource that is shared by several devices then there may often be contending items requiring access to the resource and thus, a buffer for storing pending items may be required.

In some embodiments, said resource comprises a cache, said dependencies being dependencies that would arise in response to data accesses to said cache, said at least one recipient comprising at least one higher memory level, said cache comprising said buffer for storing data related to a data access to said cache that cannot complete before an access to said higher memory level is made; said method comprising the further steps of:

determining from said data traffic and from characteristics of said cache whether data accesses within said data traffic will hit or miss in said cache and if data is to be written to or evicted from said cache;

updating said counter in response to said data accesses requiring said buffer and in response to said data traffic indicating a buffer entry has become available.

One particular resource where dependencies arise is a cache. Almost all high performance initiator devices in a modern system on chip are cached. The vast majority of traffic that is seen by the interconnect within the system does not come from the initiator such as the CPU itself but from the cache controller as a result of cache misses. If the majority of dependencies in the traffic flow are due to the cache itself then modelling these dependencies may be sufficient to provide an accurate model of the system that accounts for dependencies accurately, without the need to generate complex model of the initiator itself or capture elastic trace.

It should be noted that if dependencies are not modelled then if the system is changed in some way, the model may not accurately reflect the effect of the change on the performance of the system.

In some embodiments, said cache comprises two buffers, a line fill buffer for storing data to be written to said cache; and an eviction buffer for storing at least some data evicted from said cache that is to be written to said higher memory level, prior to it being written, wherein said step of determining a size of said buffer comprises determining a size of both said line fill buffer and said eviction buffer of said cache and setting a maximum value of two counters which each represent said line fill and eviction buffers respectively, said maximum value corresponding to said buffers respective sizes;

said step of updating said counter, comprises updating a respective one of said counters in response to said data accesses requiring said respective buffer and in response to said data traffic indicating a data item in a respective buffer has been successfully stored elsewhere and can be overwritten; and said steps of determining where said buffer that is required by a data access is at its maximum value is performed for each buffer as is said step of modifying said timing.

Buffers within a cache which produce dependencies in a traffic flow may be the line fill and the eviction buffer which may cause accesses to the cache to stall while memory accesses complete. It should be noted that although only these buffers are modelled in this embodiment, other buffers associated with the cache could also be modelled in this way. For example, where there is more than one cache within a system, data accesses to one cache will require accesses to other caches to check that there are no other versions of the data item being access stored elsewhere, this requires cache coherency circuitry which will also have buffers for storing items being snooped for example. Depending on the implementation and the size of these buffers they may also affect dependencies and they could be modelled in the same way.

In some embodiments, said step of updating said counter representing said eviction buffer comprises incrementing said counter in response to a dirty data item in said cache being evicted from said cache and decrementing said counter in response to receipt at said cache of a signal indicating said higher level memory has stored a data item received from said eviction buffer.

The eviction buffer counter is incremented in response to a dirty data item in the cache being evicted as this data item will be stored in the eviction buffer prior to it being written back to memory. The counter is decremented when an entry in the buffer becomes available. This may be when the data item has been transmitted from the buffer or it may be when a response has been received from the higher level memory indicating that the data item has been successfully stored.

In some embodiments, said data traffic comprises at least one of data traffic generated by a model of said at least one initiator, data traffic generated by said at least one initiator and data traffic generated from a trace player playing traced information obtained from a trace of said at least one initiator.

The data traffic that is used in the method may be real data traffic generated by an initiator. It may be data traffic generated by a model of the initiator and not actually relating to real data requests or it may be data traffic generated from a trace player which is playing traced information obtained from a trace of the initiator. It should be noted that generally the data traffic is not data traffic generated by the initiator itself as this would require the initiator to be instrumented. It may be data traffic generated by a simplified initiator or it may be example data traffic generated as a probability of the initiator generating certain requests.

In some embodiments, said data traffic comprises data traffic generated from a trace player playing traced information obtained from a trace of said at least one initiator and said method comprises a further step of storing said updated data traffic with said modified timings as amended traffic trace data.

One use of the invention is to improve the trace data that is used as an input to a model modelling the system. Thus, if the data traffic from the trace data is modified using the steps of this method then this modified data traffic can be stored and can be used as an input to a model of the test system and will produce a more accurate analysis of the test system.

In some embodiments, said step of determining from said data traffic and from characteristics of said cache whether data accesses within said data traffic will hit or miss in said cache comprises modelling data accesses to said cache using a model of said cache comprising probability data indicating a probability of a data access hitting or missing in said cache and of a cache line being dirty.

When modelling the behaviour in the cache, this may be done simply by modelling the cache using probability figures that have been generated to provide realistic miss, hit and dirty data percentages such that the data traffic will be modelled to act according to these probabilities.

In some embodiments, said test system comprises a model of said interconnect and a memory controller connecting said cache to said higher level memory.

The test system may comprise a model of the interconnect and a memory controller and by modifying the data traffic that is input to the model account is taken of dependencies due to the cache and as these may be the most significant dependencies then amending the data traffic in this way may generate a model that produces a more accurate simulation of the test system.

In some embodiments, said test system comprises an emulator emulating said interconnect and a memory controller connecting said cache to said higher level memory.

The test system may be an emulator which is circuitry, possibly formed of field programmable gate arrays which can be configured to perform the required function, which has been built to mimic the behaviour of the circuit being tested and which processes data more slowly than the real circuit but more quickly than a software simulation of the circuit would.

In some embodiments, said test system comprises a further cache and said method comprises the steps of modifying timings due to data accesses in said further cache using steps of the method according to an aspect of the present invention for said further cache.

If there are several caches within the system then this method can be used to modify the timings of the data traffic for each of the caches. These caches may be the same or they may be at different hierarchical levels.

In some embodiments, said cache comprises at least one further buffer and said step of determining a size of said buffer comprises determining a size of each of said buffers and providing counters which each represent one of said buffers, said maximum value of each of said counters corresponding to said buffers respective sizes;

said step of updating said counter, comprises updating a respective one of said counters in response to said data accesses requiring said respective buffer and in response to said data traffic indicating a data item in a respective buffer has been successfully stored elsewhere and can be overwritten; and said steps of determining where said buffer that is required by a data access is at its maximum value is performed for each buffer as is said step of modifying said timing.

Where a cache has several buffers then modelling the dependencies due to each of the buffers may be worthwhile. It may be found that the dependencies due to some of the buffers are insignificant, however where this is not the case then modelling each of the buffers may be required to provide an accurate result.

A second aspect of the present invention provides a computer program product for storing a computer program which when executed by a computer will perform the steps of a method according a first aspect of the present invention.

A third aspect of the present invention provides circuitry for modifying timings of data traffic in a test system by introducing dependencies that would arise in response to data requiring access to a resource, said resource receiving said data traffic from at least one initiator and being connected via an interconnect to at least one recipient, said resource comprising a buffer for storing pending data related to an access to said resource that cannot currently complete; said circuitry comprising:

a counter configured to count to a maximum value corresponding to said buffer size;

a data store for storing characteristics of said resource;

analysis circuitry configured to receive data traffic and configured to determine from said stored characteristics whether said data requires said resource;

said analysis circuitry being configured to update said counter in response to said data requiring said resource and said resource not being available and in response to said data traffic indicating an entry in said buffer has become available;

said analysis circuitry being configured to determine when data requires storage in said buffer and said counter is at its maximum value indicating said buffer is full and in response to this to modify a timing of said data requiring said buffer such that it is stalled until said buffer has capacity again and to update said data traffic with said modified timing.

In some embodiments, said circuitry is formed of FPGA field programmable gate array circuitry.

Although the circuitry that modifies the data traffic can be formed of a number of things it is often formed of field programmable gate array circuitry which is circuitry that is practical to configure to provide certain functions such that the functions required for modelling the cache can be provided for such circuitry.

The circuitry that provides the model of the cache to modify the timings may be connected to further circuitry that emulates the interconnect such that an improved testing of the interconnect can be performed.

A fourth aspect of the present invention provides timing modifying means for modifying timings of data traffic in a test system by introducing dependencies arising due to data accesses to a cache storage means, said cache storage means receiving said data traffic from at least one initiator means and being connected via an interconnect to at least one higher memory level, said cache storage means comprising a line fill buffer means for storing data to be written to said cache; and an eviction buffer means for storing at least some data evicted from said cache that is to be written to said higher memory level, prior to it being written, said time modifying means comprising:

two counting means for counting to respective maximum values;

size determining means for determining a size of said line fill buffer means and said eviction buffer means of said cache storage means and for setting said maximum values of said two counting means which represent said line fill and eviction buffer means respectively, said maximum values corresponding to said buffer means' respective sizes;

input means for inputting data traffic;

analysing means for determining from said data traffic and from characteristics of said cache storage means whether data accesses within said data traffic will hit or miss in said cache storage means and if data is to be written to or evicted from said cache storage means;

updating means for updating said counting means in response to said data accesses requiring said buffer means and in response to said data traffic indicating an entry in said buffer means has become available;

modifying means for determining where one of said buffer means is required by a data access and said counter is at its maximum value indicating said buffer is full and in response to determining this, modifying a timing of said data access requiring said buffer means such that it is stalled until said buffer means has capacity again and updating said data traffic with said modified timing.

The above, and other objects, features and advantages of this invention will be apparent from the following detailed description of illustrative embodiments which is to be read in connection with the accompanying drawings.

DESCRIPTION OF THE EXAMPLE NON-LIMITING EMBODIMENTS

The present technique recognises that almost all high performance initiator devices in a modern system-on-chip are cached. A cache will itself introduce dependencies into the traffic flow because it contains shared resources. From the perspective of the communication and memory system in a system-on-chip, the vast majority of traffic seen does not come from the CPU or other initiators but from the cache controller, that is the interconnect generally sees traffic arriving from cache misses. The present technique recognises that these dependencies may have a larger influence on performance in the system than other dependencies arising from the software or from the behaviour of the initiator might have. Furthermore, it recognises that these dependencies will be straightforward to model and thus, a system that modified the data traffic input to a model by modelling these dependencies may provide a model able to produce an accurate result without the need to model the dependencies of the initiators themselves.

Figure 1:
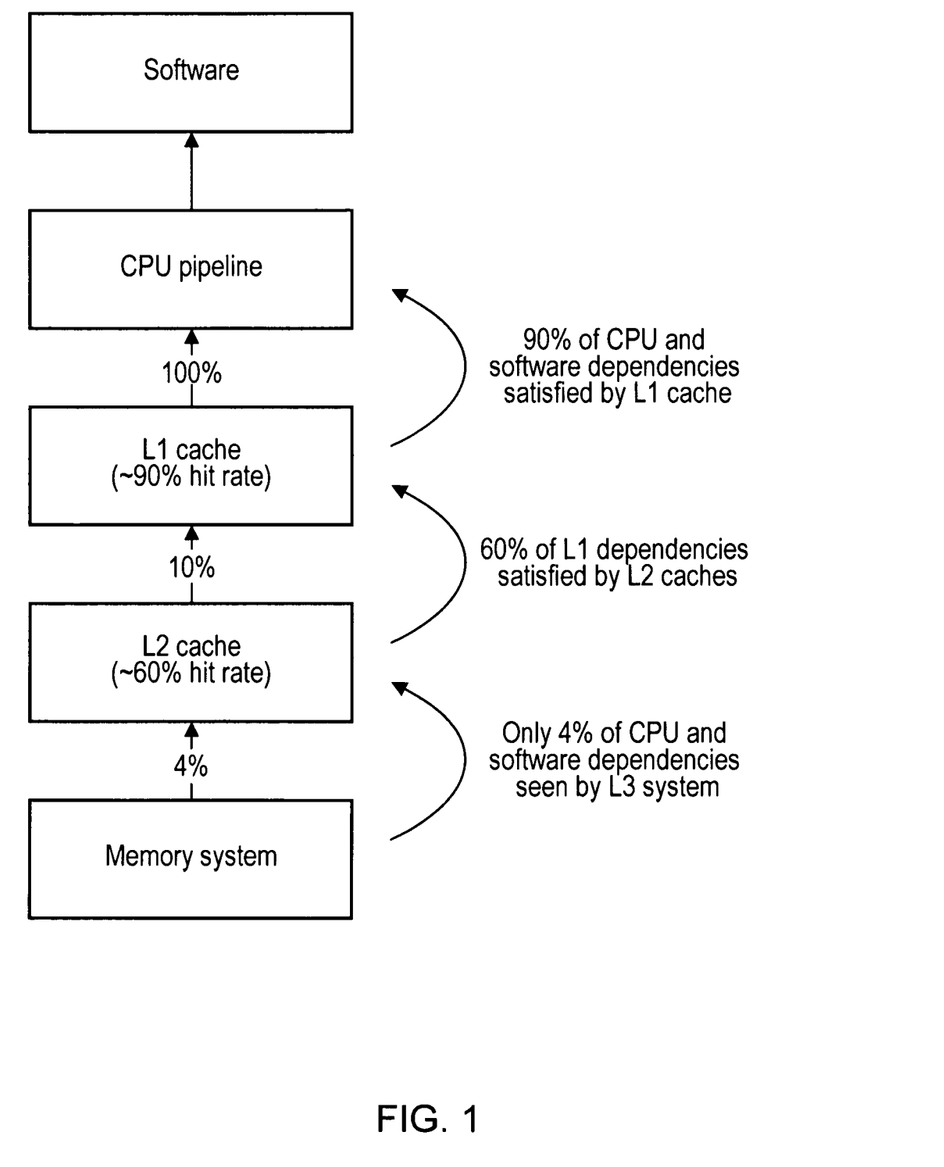
FIG. 1 shows schematically how dependencies arise due to the caching of data within a system.

In this regard, FIG. 1 shows a system having typical cache hit rates. In this regard there is a 90% hit rate in the L1 cache such that 90% of the CPU and software dependencies are satisfied by the L1 cache. There is then a 60% hit rate in the L2 cache so that 60% of the L1 dependencies are satisfied by the L2 cache and only 4% of CPU and software dependencies are seen by the L3 system. If one is modelling the L3 system then as can be seen dependencies due to delays caused by the caches will have an important effect on the data traffic seen by the interconnect and memory L3 system.

Figure 2:
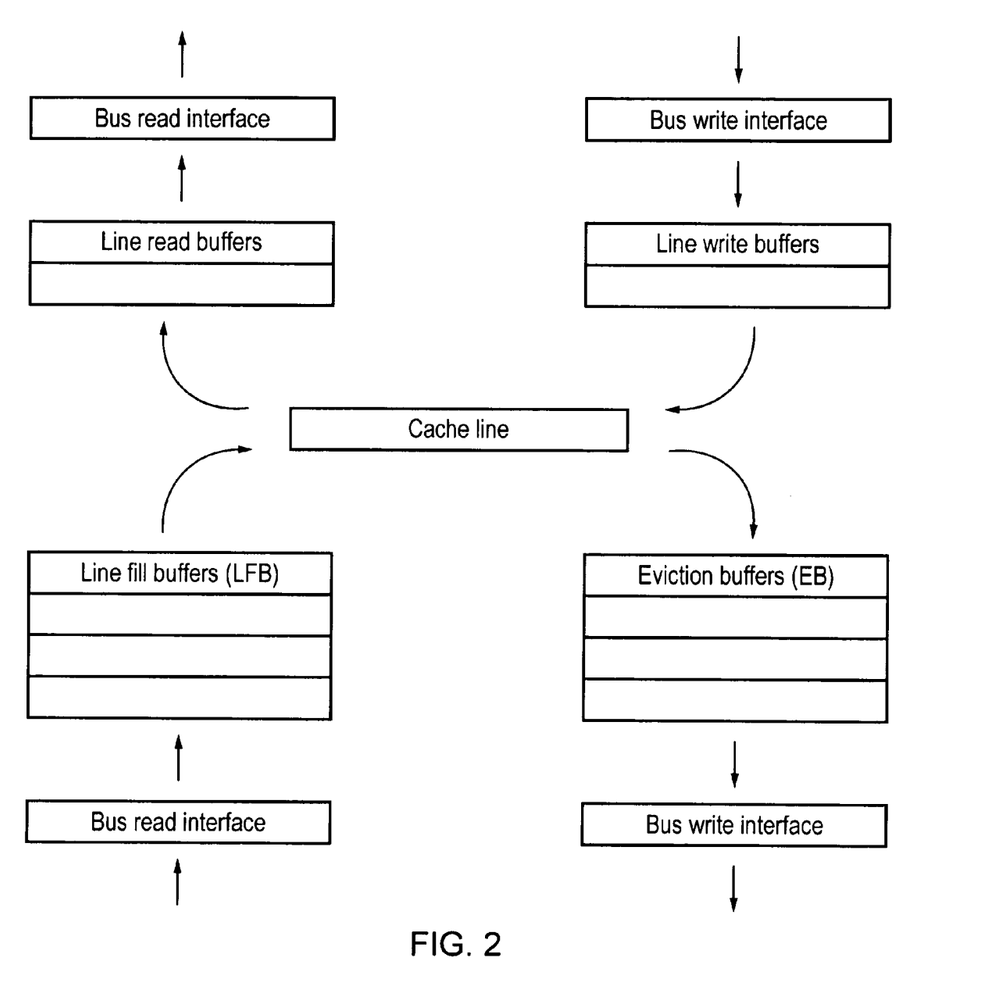
FIG. 2 shows the effect of the buffers within this dependency.

FIG. 2 shows the flow of data into and out of a cache via buffers. Thus, many cache controllers will have a bank of line fill buffers that receive data from requests sent from the cache controller in response to cache read misses from the lower level memory system. A bank of eviction buffers receives lines of data from cache memory that need to be written back to the higher level memory system. In order to store read or write data in a cache line on a cache miss, a line must be evicted from the cache. If the evicted line was dirty, that is it has been modified while in the cache and the memory has not yet been updated, this modified data must therefore be written back to the higher memory system before the line can be used for the read or write data.

If the miss was on a read then the line must be fetched from the higher level memory system before it can be written to the cache. These processes introduce dependencies into the traffic flow. Buffers in the cache relax these dependencies somewhat. Modelling the buffer occupancy and delays that occur due to buffers being full is one way of modelling the effects these dependencies have on the data traffic flow. Furthermore, it is a simple thing to model and enables the traffic flow timings to be modified in a relatively simple manner while still producing an accurate result.

FIG. 2 shows how the buffers used for accessing the cache are filled and emptied and how their becoming full can affect the speed of the data accesses. Thus, where there is a read request and it misses in the cache the value needs to be fetched from memory and this value is input into the line fill buffer and it then awaits a cache line to become free so that it can be written into the cache line whereupon it can be read out from the cache via the line read buffer. In order for a cache line to become free a cache line may be evicted to an eviction buffer provided there is space in the eviction buffer. Where the cache line that is being evicted is a dirty line it needs to be written back to memory and thus, it needs to stay in the eviction buffer until this write to memory has been completed. This may be in response to an acknowledgment from the memory or it may assume that it will complete successfully once it has been sent. In some embodiments, where the cache line being evicted is clean then it is not sent via the eviction buffers.

Where there is a write to the cache then this value is input into a line write buffer and it is determined if it hits in the cache. If it does not hit in the cache then a line needs to be allocated to it and to do this a line is evicted to the eviction buffers and if the line is dirty it is to be written back to memory. Where the eviction buffer is full then the cache will not be able to evict any new data until the line becomes available in the eviction buffer. This may occur when the memory write has been successful. As you can see there are more than two buffers in the cache controller of this embodiment, however it is the eviction buffer and the line fill buffer that have the greatest effect on the timings due to data dependencies. In other embodiments the other buffers may also have an effect and may therefore also be modelled. The advantage of modelling these buffers depends on their respective sizes and how likely it is that they are to become full and introduce a delay. Where they are likely to become full then they will have an effect on the data traffic timings and therefore should be included in the model.

Figure 3:
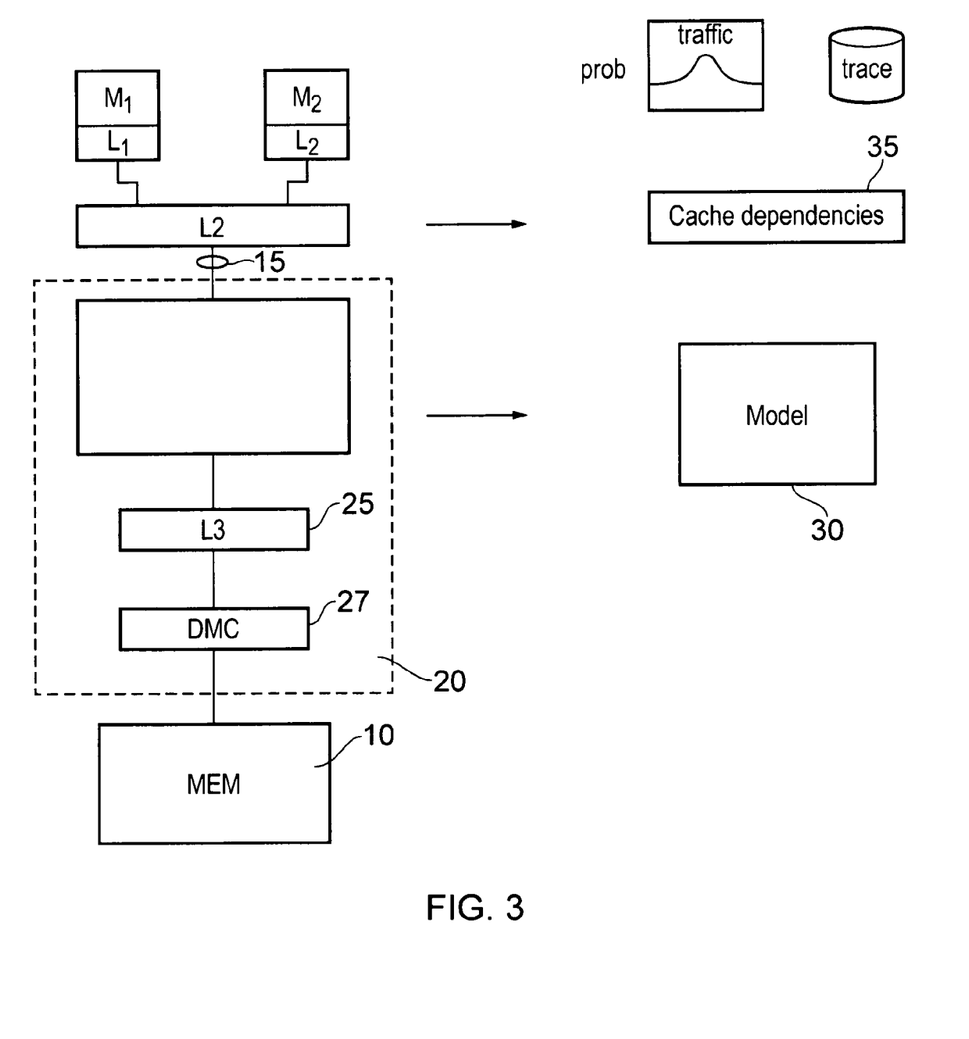
FIG. 3 shows a system to be modelled according to an embodiment of the present invention.

FIG. 3 shows an example of a system that is to be modelled and how an embodiment of the present invention is used to improve this model. Thus, in this example there are two masters M1 and M2, each having their own private cache L1 and having a shared cache L2. These masters communicate with a memory 10 via an interconnect 20 that comprises its own L3 store 25. There is also a memory controller 27.

When testing this system the interconnect is generally modelled using a model shown schematically as 30 and example traffic is input to this model. This example data traffic is traffic that would be seen on the bus at point 15 and may be generated from modelling the behaviour of the masters and generating example requests with the required probability, or by tracing an example system and playing the trace back with a trace player.

The present technique will in this example determine how L2 cache dependencies will affect the data traffic and it will generate modified timings to the data flow that is input to model 30. Thus, a cache dependency model 35 may be inserted into the data traffic that is input to the model and this modifies the timings of the data traffic and improves the accuracy of the model by taking account of these dependencies.

Figure 4:
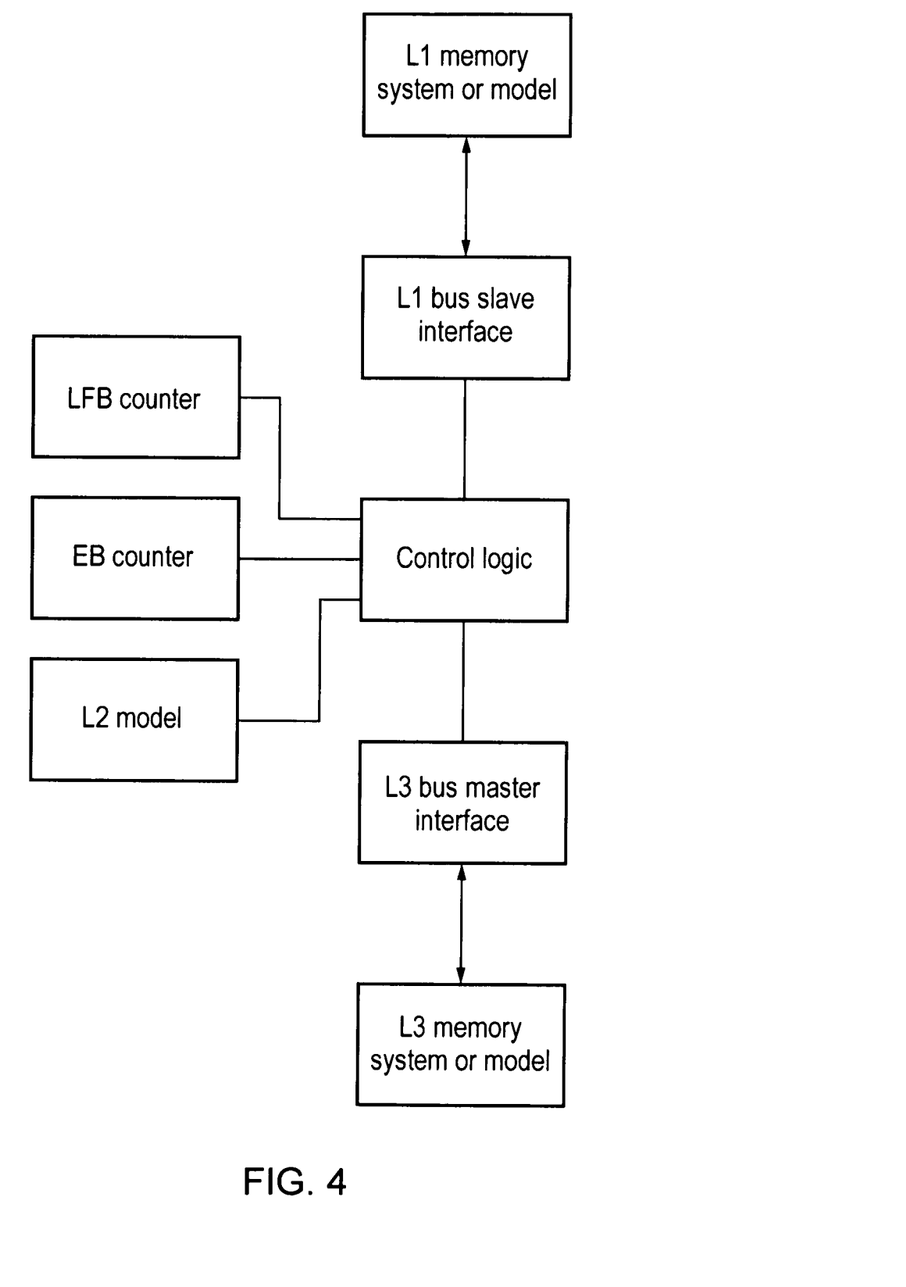
FIG. 4 shows a block diagram of such a model according to an embodiment of the present invention.

The way this works is shown in more detail in FIG. 4. In this example, the eviction buffer is modelled by a counter whose maximum value is set to the number of lines in the eviction buffer and by a line fill buffer counter which similarly is set to have a maximum value that is equal to the number of lines in the line fill buffer. In this case the technique is used to modify the traffic flow in the L2 cache. The data traffic from a model that models the master and the L1 cache is sent to the control logic which contains characteristics of the L2 cache in the form of probabilities of misses, hits and data being dirty and which contains counters that model the occupancy of the line fill and eviction buffers. The timings of the input data traffic are modified using this information and the modified data traffic is output to the model of the L3 system.

As noted above the behaviour of the data traffic input to the control logic will be modelled according to the probability data for the cache and the eviction buffer counter and the line fill buffer counter will be incremented and decremented as values are stored in them or the lines become available. Where a counter reaches its maximum value and the data traffic indicates that a value needs to be stored in the buffer, for the data to proceed further then the timings of that data traffic will be modified to account for the fact that this access request will be stalled until the buffer becomes available again. This enables dependencies due to the shared buffer resource to be accounted for and improves the accuracy of the model. Although, the current examples shows a model of the L2 cache, it should be noted that different levels of caches could be modelled or plural levels of caches could be modelled using this model and dependencies introduced to improve the accuracy of the data flow in this way.

The L1 memory system or model could be for example a CPU cluster with integrated L1 cache running software, it could be a synthesisable traffic generator on a FPGA or emulator, a VPE model generating constrained random traffic or an elastic or traffic trace player.

Figure 5:
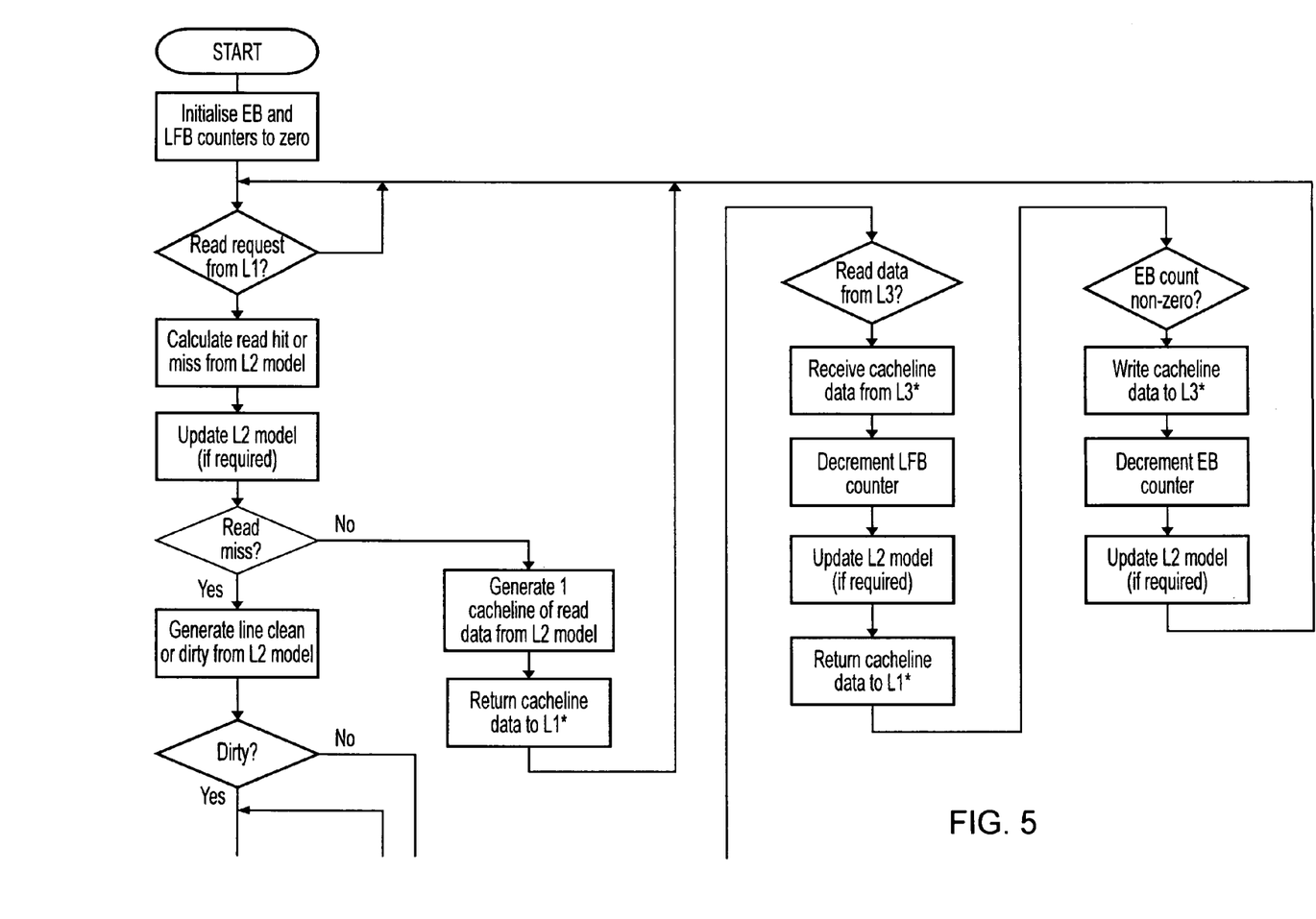
FIG. 5 shows a flow diagram illustrating what occurs for reads in an L1 cache.

FIG. 5 is a flowchart describing the function of the control logic of FIG. 4 in response to receipt of a read request in the data traffic sent from an L1 cache. Items marked with an asterisk may take more than one cycle, the length of time they take depending on the bus protocol. The flowcharts are seen in serial form for ease of understanding but in hardware the logic would typically be implemented in parallel using logic circuits.

Thus, initially the eviction buffers and line fill buffer counters are set to zero indicating these buffers are empty. In response to a read request from the L1, the probability of a read hit is determined from the L2 model, and if there is not a hit and a read miss occurs then it is determined if the line to be evicted is clean or dirty from the L2 model.

If it is decided that the line is dirty then it is determined whether the eviction buffer count is at its maximum value, i.e. it is full. If it is at its maximum then the process stalls until it is no longer at its maximum value and has space to accept the evicted line. This affects the timing of this particular access. If the eviction buffer is not full and the counter is not at its maximum value then a write address is generated from the L2 model and the eviction buffer counter is incremented and the write is issued to L3. If the evicted line was not dirty then the eviction buffer is not affected.

Next it is determined if the line fill buffer count is at its maximum. If it is at its maximum then the process stalls until there is a space in the line fill buffer and the timings are affected. If it isn't full then the read request is accepted from the L1 and the line fill buffer counter is incremented. The read is then issued to the L3 and data is read from L3. The line fill buffer counter is then decremented and the L2 model is updated if required. The cache line data is returned to the L1 and it is determined if the eviction buffer counter is non-zero. If it is non-zero then when the cache line is written to L3 the eviction buffer counter is decremented and one returns to determining if there is a new read request from the L1.

If there was a read miss then one cache line of read data is generated from the L2 model and the cache line data is returned to L1.

Figure 6:
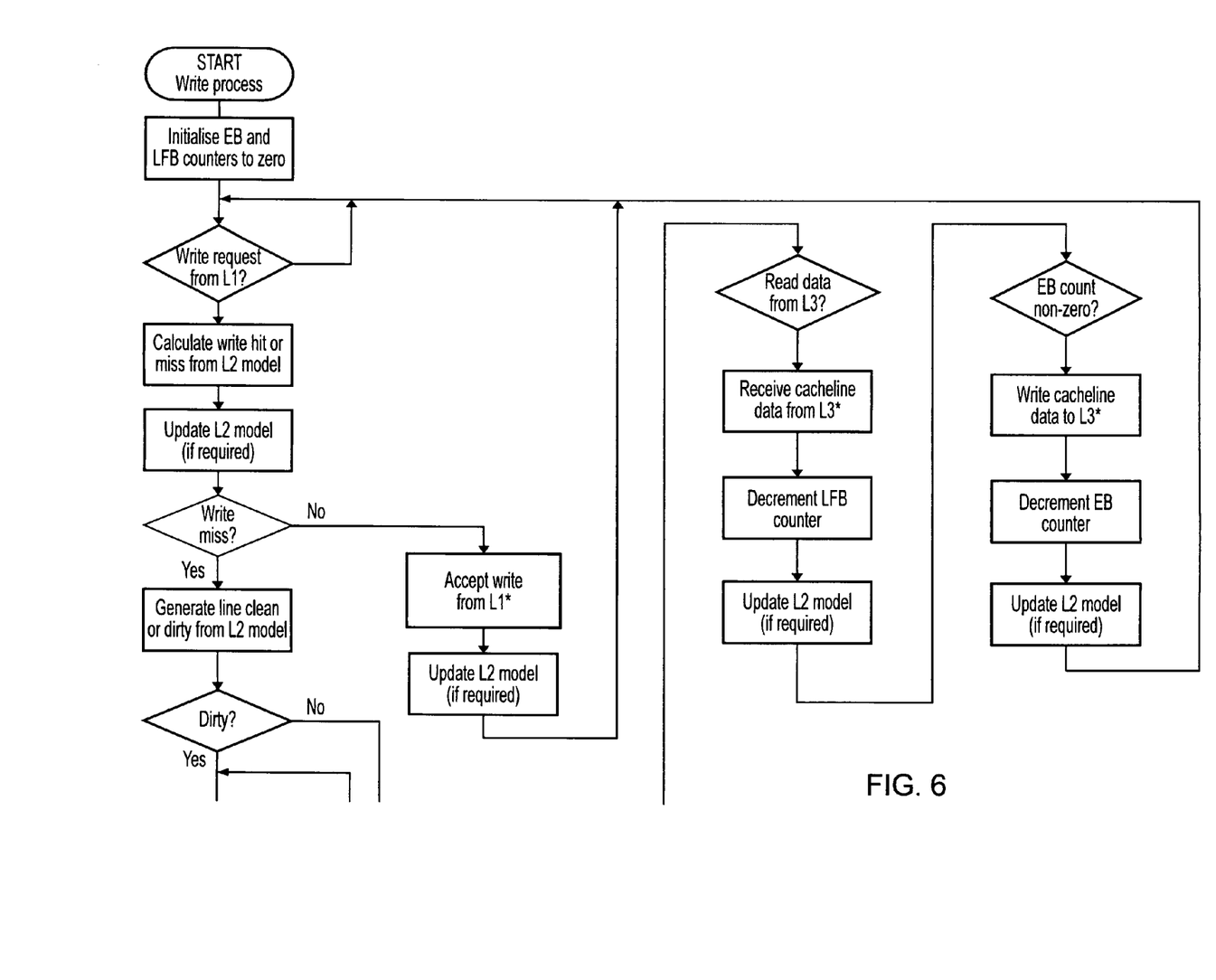
FIG. 6 shows a flow chart of what occurs for L1 write.

A flowchart showing what occurs in the control logic according to an embodiment of the present invention for an L1 write is shown in FIG. 6. In this case the write process is started and the eviction buffer and line fill buffer counters are set to zero to indicate that they are empty. When a write request is received from the L1 model the write hit is calculated on a probability basis from the L2 model and the L2 model is updated if this is required. In this regard, when dealing with probabilities of an event then a record of what has occurred needs to be kept so that the probability can be adhered to.

If the model determines there is a write miss, a determination is made from the L2 model as to whether the line to be written to is clean or dirty and if it is dirty it is determined whether the eviction buffer count is at its maximum. If it is at its maximum this will stall this access request and thus, it waits until there is space in the eviction buffer, that is the eviction buffer count is no longer at its maximum, whereupon the eviction of the line can occur and the access can proceed. This delay modifies the timings of this data access request and taking account of this delay improves the accuracy of the model. When there is space in the eviction buffer the write address is generated from the L2 model and the eviction buffer counter is incremented. The write request is then issued to L3.

If the data of the line to be evicted had been determined not to be dirty then the next step in the writing of the data would have been performed immediately as the eviction buffer was not required.

The next step is to determine if L1 wrote the full cache line and then it will be determined if the line fill buffer count is at its maximum. If it is then the model stalls the data request from completing until this counter is no longer at its maximum and there is space in the line fill buffer. This stalling will again modify the timings of this data access. When there is space the line fill counter is incremented and a read request is issued to L3. Data is then read from L3 and the data cache line is received. At this point this data can be written into the cache so that the line fill buffer counter is decremented and the L2 model is updated if required. It is then determined if the eviction buffer count is non-zero. If it is once the cache line has written data to L3 the eviction buffer counter is decremented and the L2 model is updated if required. If there was no miss in the L2 cache of the original write request from the L1 model, then the write would have been accepted from the L1 model and the L2 model would have been updated if required.

Figure 7:
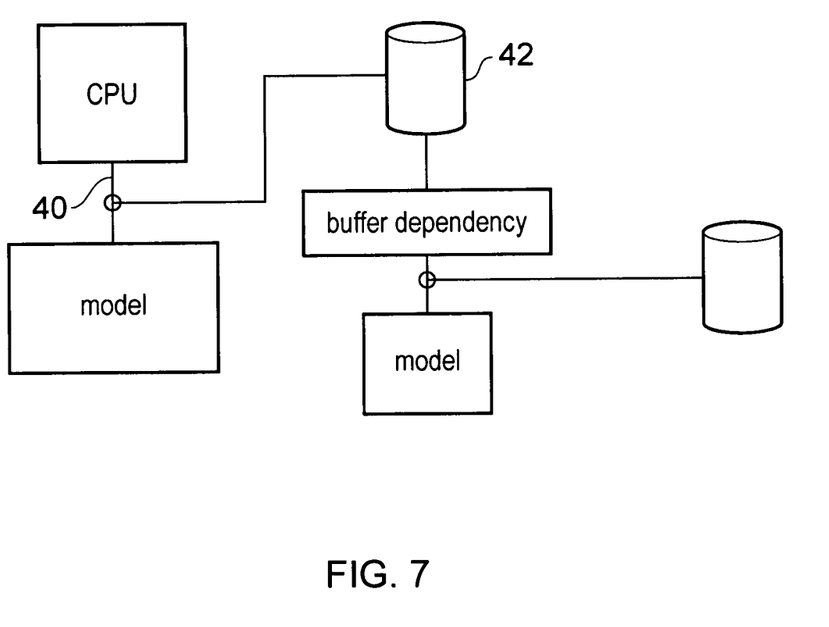
FIG. 7 shows how an embodiment of the present invention can amend the data traffic obtained from tracing a bus.

FIG. 7 shows an example of how an embodiment of the present invention may be implemented. In this embodiment an example CPU generates data traffic which is input to a model of a system being analysed, the model may be an emulator of the system. The bus 40 between the CPU and the model is traced and a record of this trace is stored 42. This trace can then be played using a trace player not shown and a buffer resource dependency model according to an embodiment of the present invention can be used to modify the timings of the data traffic from this trace prior to it being input to the system model. The input to the model can be done immediately or the data traffic flow of the trace modified by the buffer dependency model can be stored and this modified trace can be used in a trace player as in input to the model at another time.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

I claim:

1. A method of modifying timings of data traffic in a test system by introducing dependencies that would arise in response to data requiring access to a resource, wherein said test system comprises a model of a system comprising said resource receiving said data traffic from at least one initiator and being connected via an interconnect to at least one recipient, said resource comprising a buffer for storing pending data related to an access to said resource that cannot currently complete; said method comprising the steps of:

storing for said test system a maximum value of a counter which represents said buffer, to a value representative of a buffer size of said buffer;

inputting data representative of modeled data traffic;

updating said counter in response to said data requiring said resource and being stored in said buffer and in response to said data traffic indicating a buffer entry has become available;

determining for said test system where said data requires said buffer and said counter is at the maximum value indicating said buffer is full;

modifying a timing of said data access requiring said buffer indicating that said data is stalled until said buffer has capacity again;

updating said data traffic with said modified timing for said test system, wherein said resource comprises a cache, said dependencies being dependencies that would arise in response to data accesses to said cache, said at least one recipient comprising at least one higher memory level, and said cache comprising said buffer for storing data related to a data access to said cache that cannot complete before an access to said higher memory level is made;

said method comprising the further steps of:

determining from said data traffic and from characteristics of said cache whether data accesses within said data traffic will hit or miss in said cache and if data is to be written to or evicted from said cache;

updating said counter in response to said data accesses requiring said buffer and in response to said data traffic indicating a buffer entry has become available.

2. A method according to claim 1, comprising a further step of determining a size of said buffer of said resource, said step of setting said maximum value of said counter being performed in response to said determining step.

3. A method according to claim 1, wherein said resource comprises a shared resource.

4. A method according to claim 1, wherein said cache comprises two buffers, a line fill buffer for storing data to be written to said cache; and an eviction buffer for storing at least some data evicted from said cache that is to be written to said higher memory level, prior to the data being written, wherein said step of determining a size of said buffer comprises determining a size of both said line fill buffer and said eviction buffer of said cache and setting a maximum value of two counters which each represent said line fill and eviction buffers respectively, said maximum value corresponding to said buffers respective sizes;

said step of updating said counter, comprises updating a respective one of said counters in response to said data accesses requiring said respective buffer and in response to said data traffic indicating a data item in a respective buffer has been successfully stored elsewhere and can be overwritten; and said steps of determining where said buffer that is required by a data access is at the maximum value is performed for each buffer as is said step of modifying said timing.

5. A method according to claim 4, wherein said step of updating said counter representing said eviction buffer comprises incrementing said counter in response to a dirty data item in said cache being evicted from said cache and decrementing said counter in response to receipt at said cache of a signal indicating said higher level memory has stored a data item received from said eviction buffer.

6. A method of modifying timings of data traffic according to claim 1, wherein said data traffic comprises at least one of data traffic generated by a model of said at least one initiator, data traffic generated by said at least one initiator and data traffic generated from a trace player playing traced information obtained from a trace of said at least one initiator.

7. A method according to claim 6, wherein said data traffic comprises data traffic generated from a trace player playing traced information obtained from a trace of said at least one initiator and said method comprises a further step of storing said updated data traffic with said modified timings as amended traffic trace data.

8. A method according to claim 1, wherein said step of determining from said data traffic and from characteristics of said cache whether data accesses within said data traffic will hit or miss in said cache comprises modelling data accesses to said cache using a model of said cache comprising probability data indicating a probability of a data access hitting or missing in said cache and of a cache line being dirty.

9. A method according to claim 1, wherein said test system comprises at least one of a software model of said interconnect and an emulator emulating said interconnect; and a memory controller connecting said cache to said higher level memory.

10. A method according to claim 1 wherein said test system comprises a further cache and said method comprises the steps of modifying timings due to data accesses in said further cache using steps of the method according to claim 1 for said further cache.

11. A method according to claim 10, where said further cache is at a different hierarchical level to said cache and is at a lower hierarchical level to said higher memory level.

12. A method according to claim 4, wherein said cache comprises at least one further buffer and said step of determining a size of said buffer comprises determining a size of each of said buffers and providing counters which each represent one of said buffers, said maximum value of each of said counters corresponding to said buffers respective sizes;

said step of updating said counter, comprises updating a respective one of said counters in response to said data accesses requiring said respective buffer and in response to said data traffic indicating a data item in a respective buffer has been successfully stored elsewhere and can be overwritten; and said steps of determining where said buffer that is required by a data access is at its maximum value is performed for each buffer as is said step of modifying said timing.

13. A non-transitory storage medium for storing a computer program which when executed by a computer will perform the steps of a method according to claim 1.

14. Apparatus for modifying timings of data traffic in a test system by introducing dependencies that would arise in response to data requiring access to a resource, said test system comprising a model of a system comprising said resource receiving said data traffic from at least one initiator and being connected via an interconnect to at least one recipient, said resource comprising a buffer for storing pending data related to an access to said resource that cannot currently complete; said apparatus comprising:

storage circuitry configured to store a maximum value of a counter which represents said buffer, said maximum value representative of a buffer size of said buffer;

a counter associated with said test system and configured to count to the stored maximum value;

a data store for storing characteristics of said resource;

analysis circuitry associated with said test system and configured to receive data representative of modeled data traffic and configured to determine from said stored characteristics whether said data requires said resource;

said analysis circuitry being configured to update said counter in response to said data requiring said resource and said resource not being available and in response to said data traffic indicating an entry in said buffer has become available;

said analysis circuitry being configured to determine when data requires storage in said buffer and said counter is at the maximum value indicating said buffer is full and in response to this to modify a timing of said data requiring said buffer such that the data is stalled until said buffer has capacity again and to update said data traffic with said modified timing, wherein said resource comprises a cache said dependencies being dependencies that would arise in response to data accesses to said cache, said at least one recipient comprising at least one higher memory level, said cache comprising said buffer for storing data related to a data access to said cache that cannot complete before an access to said higher memory level is made;

said analysis circuitry being further configured to:

determine from said data traffic and from characteristics of said cache whether data accesses within said data traffic will hit or miss in said cache and if data is to be written to or evicted from said cache;

update said counter in response to said data accesses requiring said buffer and in response to said data traffic indicating a buffer entry has become available.

15. The apparatus according to claim 14, wherein said cache comprises two buffers, a line fill buffer for storing data to be written to said cache; and an eviction buffer for storing at least some data evicted from said cache that is to be written to said higher memory level, prior to the data being written, wherein said circuitry further comprises:

a second counter;

said analysis circuitry being configured to determine a size of both said line fill buffer and said eviction buffer of said cache and to set a maximum value of said counter and said second counter which represent said line fill and eviction buffers respectively, said maximum value corresponding to said buffers respective sizes;

said analysis circuitry being configured to update a respective one of said counters in response to said data accesses requiring said respective buffer and in response to said data traffic indicating a data item in a respective buffer has been successfully stored elsewhere and can be overwritten; and to determine where said counter relating to said buffer that is required by a data access is at the maximum value to modify said timing of said data access.

16. The apparatus according to claim 14, wherein said circuitry is formed of FPGA field programmable gate array circuitry.

17. The apparatus according to claim 16, wherein said circuitry is connected to further circuitry that emulates said interconnect.

18. A system for modifying timings of data traffic in a test system by introducing dependencies that would arise in response to data requiring access to a resource, said test system comprising a model of a system comprising said resource receiving said data traffic from at least one initiator and being connected via an interconnect to at least one recipient, said resource comprising a means for buffering pending data related to an access to said resource that cannot currently complete; said system comprising:

means for storing a maximum value which represents a size of said means for buffering;

means for counting to the stored maximum value;

a data store for storing characteristics of said resource;

means, receiving data representative of modeled data traffic, for determining from said stored characteristics whether said data requires said resource;

said means for determining being configured to update said means for counting in response to said data requiring said resource and said resource not being available and in response to said data traffic indicating an entry in said means for buffering has become available;

said means for determining being configured to determine when data requires storage in said means for buffering and said means for counting is at the maximum value indicating said means for buffering is full and in response to this to modify a timing of said data requiring said means for buffering such that the data is stalled until said means for buffering has capacity again and to update said data traffic with said modified timing, wherein said resource comprises a cache, said dependencies being dependencies that would arise in response to data accesses to said cache, said at least one recipient comprising at least one higher memory level, and said cache comprising said means for buffering data related to a data access to said cache that cannot complete before an access to said higher memory level is made;

said means for determining being further configured to:

determine from said data traffic and from characteristics of said cache whether data accesses within said data traffic will hit or miss in said cache and if data is to be written to or evicted from said cache;

update said means for counting in response to said data accesses requiring said means for buffering and in response to said data traffic indicating an entry in the means for buffering has become available.

* * * * *